(12) United States Patent
Zhang et al.

(10) Patent No.: US 10,542,489 B2
(45) Date of Patent: Jan. 21, 2020

(54) TERMINAL WAKEUP METHOD AND APPARATUS

(71) Applicant: HUAWEI TECHNOLOGIES CO., LTD., Shenzhen (CN)

(72) Inventors: Mingming Zhang, Suzhou (CN); Keming Zhao, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/922,930

(22) Filed: Mar. 16, 2018

(65) Prior Publication Data

US 2018/0213475 A1 Jul. 26, 2018

Related U.S. Application Data

(63) Continuation of application No. PCT/CN2016/098358, filed on Sep. 7, 2016.

(30) Foreign Application Priority Data

Sep. 17, 2015 (CN) .......................... 2015 1 0594654

(51) Int. Cl.
*H04W 52/02* (2009.01)
*H04W 84/12* (2009.01)
*H04W 88/08* (2009.01)

(52) U.S. Cl.
CPC ........ *H04W 52/0212* (2013.01); *H04W 84/12* (2013.01); *H04W 88/08* (2013.01)

(58) Field of Classification Search
CPC ............. H04W 52/0212; H04W 24/02; H04W 52/0216; H04W 52/0229; H04W 52/0235; H04W 76/28; H04W 84/12; H04W 88/08
See application file for complete search history.

(56) References Cited

U.S. PATENT DOCUMENTS

| 6,363,267 | B1 * | 3/2002 | Lindskog | .......... H04W 52/0216 |
| | | | | 455/574 |
| 9,654,999 | B2 * | 5/2017 | Smadi | ............... H04W 28/0215 |
| 2004/0223493 | A1 * | 11/2004 | Benveniste | .......... H04L 1/1829 |
| | | | | 370/394 |
| 2006/0030362 | A1 * | 2/2006 | Fukuda | ................. H04W 48/12 |
| | | | | 455/561 |

(Continued)

FOREIGN PATENT DOCUMENTS

| CN | 104125595 A | 10/2014 |
| CN | 104796971 A | 7/2015 |

(Continued)

OTHER PUBLICATIONS

IQ.IP.com patent search; May 3, 2019 (Year: 2019).*

(Continued)

*Primary Examiner* — Benjamin H Elliott, IV
(74) *Attorney, Agent, or Firm* — Kilpatrick Townsend & Stockton

(57) ABSTRACT

A terminal wakeup method and an apparatus are disclosed. The method includes: if an access point fails to send a data frame to a station, and the access point fails to send a data frame to the station after channel switching, sending, by the access point, a wakeup signal to the station to wake up the station. According to the method, a data frame loss caused by channel switching can be reduced.

8 Claims, 2 Drawing Sheets

(56) References Cited

U.S. PATENT DOCUMENTS

| | | | | |
|---|---|---|---|---|
| 2008/0084836 | A1* | 4/2008 | Baird | G08C 17/02 370/311 |
| 2009/0147678 | A1* | 6/2009 | Xhafa | H04L 1/0002 370/232 |
| 2009/0296854 | A1* | 12/2009 | Yamano | H04B 15/00 375/296 |
| 2010/0177712 | A1* | 7/2010 | Kneckt | H04W 76/14 370/329 |
| 2012/0263094 | A1* | 10/2012 | Wentink | H04W 52/0216 370/312 |
| 2014/0016568 | A1* | 1/2014 | Koskela | H04W 52/0206 370/329 |
| 2014/0071874 | A1* | 3/2014 | Li | H04N 19/65 370/311 |
| 2014/0148100 | A1* | 5/2014 | Kim | H04W 72/0406 455/41.2 |
| 2014/0211678 | A1* | 7/2014 | Jafarian | H04W 52/0216 370/311 |
| 2014/0254450 | A1* | 9/2014 | Wentink | H04W 52/0216 370/311 |
| 2015/0131462 | A1* | 5/2015 | Puranik | H04W 52/0212 370/252 |
| 2015/0208349 | A1* | 7/2015 | Ramamurthy | H04W 52/0212 370/311 |
| 2015/0334654 | A1* | 11/2015 | Choi | H04W 4/70 370/311 |
| 2016/0212704 | A1* | 7/2016 | Matsunaga | H04W 52/0216 |
| 2016/0330764 | A1* | 11/2016 | Kim | H04W 74/02 |
| 2016/0360473 | A1* | 12/2016 | Kim | H04W 24/02 |
| 2017/0071022 | A1* | 3/2017 | Sampath | H04W 48/18 |
| 2017/0164205 | A1* | 6/2017 | Yang | H04W 16/02 |
| 2017/0164283 | A1* | 6/2017 | Choi | H04W 74/006 |
| 2017/0215145 | A1* | 7/2017 | Solotke | H04W 52/0235 |
| 2017/0273023 | A1* | 9/2017 | Seok | H04W 74/08 |
| 2018/0167882 | A1* | 6/2018 | Choi | H04W 52/0216 |
| 2018/0213475 | A1* | 7/2018 | Zhang | H04W 24/02 |
| 2018/0293538 | A1* | 10/2018 | Berger | G06Q 10/08 |
| 2018/0302854 | A1* | 10/2018 | Ramamurthy | H04W 52/0212 |

FOREIGN PATENT DOCUMENTS

| | | |
|---|---|---|
| EP | 2827657 A1 | 1/2015 |
| WO | 2013155990 A1 | 10/2013 |

OTHER PUBLICATIONS

English translation of International Search Report for PCT/CN2016/098358, dated Nov. 11, 2016 (Year: 2016).*

Marc Emmelmann et al., "Influence of Network Load on the Performance of Opportunistic Scanning", IEEE Conference on Local Computer Networks, dated 2009, total 9 pages.

* cited by examiner

TERMINAL WAKEUP METHOD AND APPARATUS

CROSS-REFERENCE TO RELATED APPLICATIONS

This application is a continuation of International Application No. PCT/CN2016/098358, filed on Sep. 7, 2016, which claims priority to Chinese Patent Application No. 201510594654.6, filed on Sep. 17, 2015. The disclosures of the aforementioned applications are hereby incorporated by reference in their entireties.

TECHNICAL FIELD

This application relates to the communications field, and in particular, to a terminal wakeup method and an apparatus.

BACKGROUND

When there is no data communication for a wireless local area network (WLAN) communications module, a station enters a power saving state, that is, the WLAN communications module is disabled. No data communication may mean that the station neither receives a data frame or a management frame sent by another station (for example, an access point (AP)), nor needs to transmit a data frame or a management frame. Before the WLAN communications module is disabled, the station sends a null data frame including a power saving tag to the access point, to notify the access point that the station has entered the power save mode. The power saving tag in the null data frame is set in a Power Management bit in a Frame Control field. When the bit is 1, it indicates that the station is in the power save mode.

After receiving the null data frame including the power saving tag, the access point knows that the station has entered the power save mode, and does not directly send a data frame to the station, but first wakes up the station and then sends the data frame to a terminal. However, the access point not only receives and sends a data frame on an operating channel, but also needs to temporarily switch from the operating channel to another channel. The operating channel is a channel used for current data frame transmission. If the access point is using the another channel when the station sends the null data frame including the power saving tag to the access point, the access point cannot receive the null data frame that includes the power saving tag and that is transmitted on the operating channel. Because the access point does not know that the station has entered the power save mode, the access point sends a data frame to the station as usual. In this case, the data frame is lost.

SUMMARY

This application provides a terminal wakeup method and an access point, so as to resolve a technical problem of a data frame loss caused by channel switching.

According to a first aspect, a terminal wakeup method is provided, including: if an access point fails to send a data frame to a station, determining, by the access point, whether the access point fails to send a data frame to the station after last channel switching; and if the access point determines that the access point always fails to send the data frame to the station after the channel switching, sending, by the access point, a wakeup signal to the station to wake up the station.

With reference to the first aspect, in a first possible implementation of the first aspect, after the determining, by the access point, whether the access point fails to send a data frame to the station after last channel switching, the method further includes: suspending, by the access point, sending of a to-be-sent data frame to the station, and buffering the to-be-sent data frame.

With reference to the first aspect or the first possible implementation of the first aspect, in a second possible implementation of the first aspect, the determining, by the access point, whether the access point fails to send a data frame to the station after last channel switching includes: determining, by the access point according to a channel switching tag, whether the access point always fails to send the data frame to the station after the last channel switching, where the channel switching tag is set when channel switching occurs on the access point, and the channel switching tag is reset when the access point succeeds in sending a data frame to the station; and if the channel switching tag is in a set state, determining, by the access point, that the access point always fails to send the data frame to the station after the last channel switching.

With reference to the first aspect or the first possible implementation of the first aspect, in a third possible implementation of the first aspect, the determining, by the access point, whether the access point fails to send a data frame to the station after last channel switching includes: determining, by the access point according to a first variable and a second variable, whether the access point always fails to send the data frame to the station after the last channel switching, where the first variable is changed when channel switching occurs on the access point, and the second variable is changed to a value of the first variable when the access point succeeds in sending a data frame to the station; and if the first variable is different from the second variable, determining, by the access point, that the access point always fails to send the data frame to the station after the last channel switching.

According to a second aspect, a terminal wakeup apparatus is provided, including a determining module and a sending module, where the determining module is configured to determine, when an access point fails to send a data frame to a station, whether the access point fails to send a data frame to the station after last channel switching; and the sending module is configured to: when a result of the determining is that the access point always fails to send the data frame to the station, send a wakeup signal to the station to wake up the station.

With reference to the second aspect, in a first possible implementation of the second aspect, the apparatus further includes a buffer module, and the buffer module is configured to suspend sending of a to-be-sent data frame to the station, and buffer the to-be-sent data frame.

With reference to the second aspect or the first possible implementation of the second aspect, in a second possible implementation of the second aspect, the determining module is configured to: determine, according to a channel switching tag, whether the access point always fails to send the data frame to the station after the last channel switching, where the channel switching tag is set when channel switching occurs on the access point, and the channel switching tag is reset when the access point succeeds in sending a data frame to the station; and when the channel switching tag is in a set state, determine that the access point always fails to send the data frame to the station after the last channel switching.

With reference to the second aspect or the first possible implementation of the second aspect, in a third possible implementation of the second aspect, the determining module is configured to: determine, according to a first variable and a second variable, whether the access point always fails to send the data frame to the station after the last channel switching, where the first variable is changed when channel switching occurs on the access point, and the second variable is changed to a value of the first variable when the access point succeeds in sending a data frame to the station; and when the first variable is different from the second variable, determine that the access point always fails to send the data frame to the station after the last channel switching.

In this application, the access point determines whether the access point always fails to send the data frame to the station after the last channel switching. If the access point always fails to send the data frame to the station after the last channel switching, a reason that the access point fails to send the data frame to the station may be that a null data frame including a power saving tag is not received by the access point due to channel switching. In this case, the access point may send the wakeup signal to the station to wake up the station, thereby reducing a data frame loss caused by channel switching.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention.

The terms used in the embodiments of the present invention are merely for the purpose of illustrating specific embodiments, and are not intended to limit the present invention. "A", "the", and "this" used in the embodiments of the present invention and the following claims are intended to include the plural forms as well, unless the context clearly indicates otherwise. It should also be understood that the term "and/or" used herein indicates and includes any or all possible combinations of one or more associated listed items.

Figure 1:
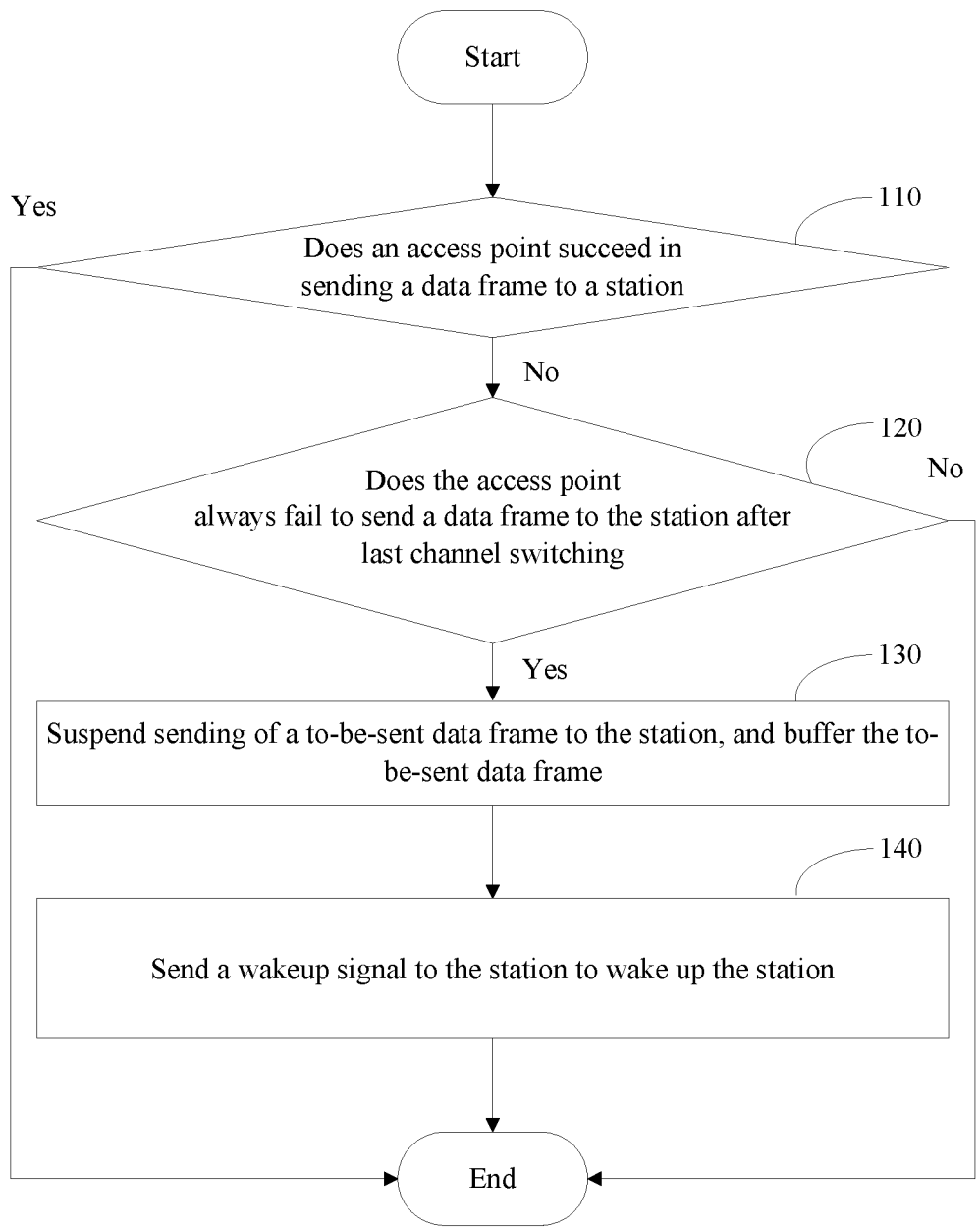
FIG. 1 is a flowchart of a terminal wakeup method according to an embodiment of the present invention.

Referring to FIG. 1, FIG. 1 is a flowchart of a terminal wakeup method according to an embodiment of the present invention. The terminal wakeup method provided in this embodiment of the present invention includes the following steps.

110. An access point determines whether sending a data frame to a station succeeds.

The station may be any device with a WLAN communications module, for example, a cellphone, a smartphone, a computer, a tablet computer, a personal digital assistant (PDA), a mobile Internet device (MID), a wearable device, or an e-book reader.

Typically, the station sends an acknowledgement (Acknowledgement, ACK) frame to the access point after receiving a data frame. Therefore, after the data frame is sent to the station, if the access point does not receive, within a preset time, an ACK frame sent by the station, the access point determines that sending the data frame to the station fails; on the contrary, if the access point receives, within a preset time, an ACK frame sent by the station, the access point determines that sending the data frame to the station succeeds. If it is determined that the access point fails to send the data frame to the station, step 120 is performed; or if the access point determines that sending the data frame to the station succeeds, the process ends.

120. The access point determines whether the access point fails to send a data frame to the station after last channel switching.

For example, if the access point has not attempted to send any data frame to the station after the last channel switching and before the access point sends, to the station, the data frame mentioned in step 110, and the access point fails to send, to the station, the data frame mentioned in step 110, the access point always fails to send the data frame to the station after the last channel switching. For another example, if the access point has attempted to send one or more data frames to the station, and the one or more data frames fail to be sent after the last channel switching and before the access point sends, to the station, the data frame mentioned in step 110, and the access point fails to send, to the station, the data frame mentioned in step 110, the access point always fails to send the data frame to the station after the last channel switching.

A method used by the access point to determine whether the access point fails to send the data frame to the station after the last channel switching includes the following.

(1) A channel switching tag is set in the access point. The channel switching tag is set when channel switching occurs on the access point, and is reset when the access point succeeds in sending a data frame to the station. The channel switching tag is in a set state after being set, and the channel switching tag is in a reset state after being reset. The set state and the reset state of the channel switching tag only need to be indicated by two different tags. For example, a value for the set state of the channel switching tag is 1, and a value for the reset state is 0; or a value for the set state of the channel switching tag is 0, and a value for the reset state is 1. After determining that sending of a data frame to the station fails, the access point queries a status of the channel switching tag. If the channel switching tag is in the reset state, the access point may determine that the access point has once succeeded in sending a data frame to the station after the last channel switching. If the channel switching tag is in the set state, the access point may determine that the access point always fails to send the data frame to the station after the last channel switching.

(2) A first variable and a second variable are set in the access point. The first variable is changed when channel switching occurs on the access point, and the second variable is changed to a value of the first variable when the access point succeeds in sending a data frame to the station. If the first variable is different from the second variable, the access point determines that the access point always fails to send the data frame to the station after the last channel switching. Specifically, it may be set that the first variable is increased by 1 when channel switching occurs on the access point, and that the second variable is changed to the value of the first variable when the access point succeeds in sending the data frame to the station. If the first variable is equal to the second variable, the access point may determine that the access point has once succeeded in sending a data frame to the station after the last channel switching. If the first variable is not equal to the second variable, the access point determines that the access point always fails to send the data frame to the station after the last channel switching. It may be understood that, when channel switching occurs on the access point, the value of the first variable may not only be changed by increasing the value of the first variable by 1, but also be changed by increasing the value of the first variable by 2 or 3 or subtracting 1 or 2 from the value of the first variable or the like.

If the access point determines that the access point always fails to send the data frame to the station after the last channel switching, a reason that the access point fails to send the data frame may be that a null data frame that includes a power saving tag and that is sent by the station is not received during the last channel switching, and the access point does not know that the station has entered a power saving mode, and wrongly sends the data frame to the station. In this case, step 130 is performed. If the access point determines that the access point has once succeeded in sending the data frame to the station after the last channel switching, a reason that the access point fails to send the data frame this time is unrelated to the last channel switching. In this case, the process ends.

130. The access point suspends sending of a to-be-sent data frame to the station, and buffers the to-be-sent data frame.

This step is optional and can reduce a loss of a data frame to be sent to the station. Alternatively, the access point may not buffer the data frame, but continue to attempt to send the to-be-sent data frame to the station. If the to-be-sent data frame is lost, the data frame is retransmitted, or an upper layer protocol packet in the to-be-sent data frame may be resent by using an upper layer protocol.

140. The access point sends a wakeup signal to the station to wake up the station.

After determining that the access point always fails to send the data frame to the station after the last channel switching, the access point sends the wakeup signal to the station. For example, the wakeup signal may be a beacon frame, a status of a traffic indication map (TIM) bit of the beacon frame changes, and the beacon frame whose TIM bit is changed is sent to the station to wake up the station.

Figure 2:
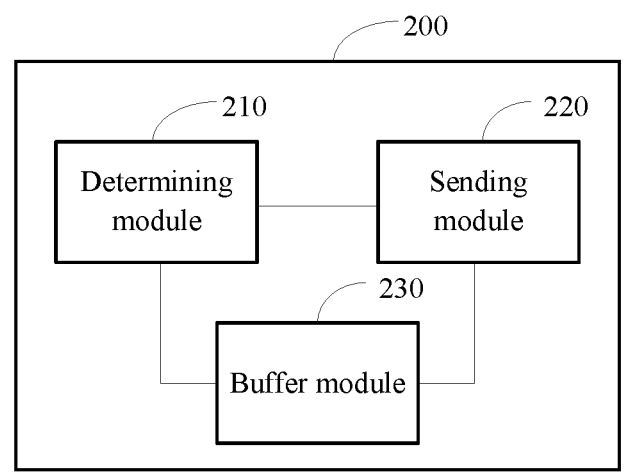
FIG. 2 is a schematic structural diagram of a terminal wakeup apparatus according to an embodiment of the present invention.

Referring to FIG. 2, FIG. 2 is a schematic structural diagram of a terminal wakeup apparatus according to an embodiment of the present invention. The terminal wakeup apparatus is disposed in an access point. The terminal wakeup apparatus 200 in this embodiment includes a determining module 210, a sending module 220, and a buffer module 230.

The determining module 210 is configured to determine, when the access point fails to send a data frame to a station, whether the access point fails to send a data frame to the station after last channel switching.

The sending module 220 is configured to: when a result of the determining is that the access point always fails to send the data frame to the station, send a wakeup signal to the station to wake up the station.

Optionally, the buffer module 230 is configured to suspend sending of a to-be-sent data frame to the station, and buffer the to-be-sent data frame.

Optionally, the determining module 210 is configured to: determine, according to a channel switching tag, whether the access point always fails to send the data frame to the station after the last channel switching, where the channel switching tag is set when channel switching occurs on the access point, and the channel switching tag is reset when the access point succeeds in sending a data frame to the station; and when the channel switching tag is in a set state, determine that the access point always fails to send the data frame to the station after the last channel switching.

Optionally, the determining module 210 is configured to: determine, according to a first variable and a second variable, whether the access point always fails to send the data frame to the station after the last channel switching, where the first variable is changed when channel switching occurs on the access point, and the second variable is changed to a value of the first variable when the access point succeeds in sending a data frame to the station; and when the first variable is different from the second variable, determine that the access point always fails to send the data frame to the station after the last channel switching.

The terminal wakeup apparatus provided in this embodiment corresponds to the terminal wakeup method shown in FIG. 1. Details are not repeated herein.

Figure 3:
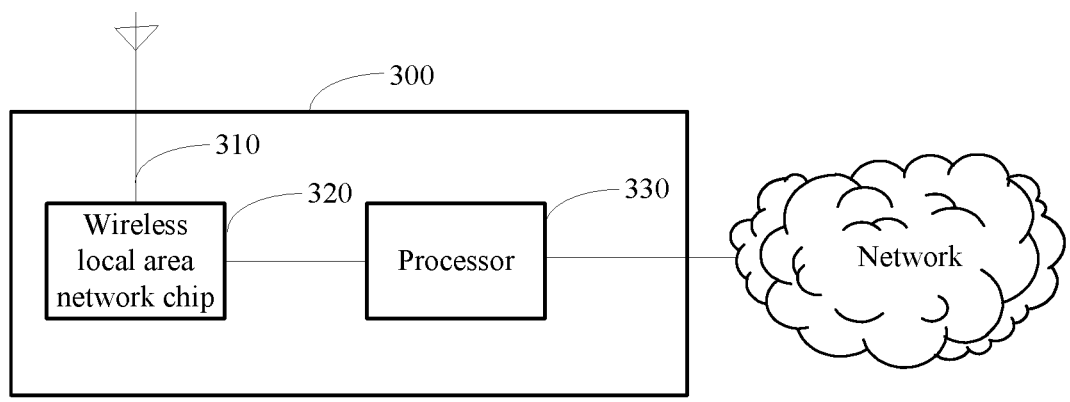
FIG. 3 is a schematic structural diagram of an access point according to an embodiment of the present invention.

Referring to FIG. 3, FIG. 3 is a schematic structural diagram of an access point according to an embodiment of the present invention. The access point 300 provided in this embodiment includes an antenna 310, a wireless local area network chip 320, and a processor 330. The antenna 310 is connected to the wireless local area network chip 320, and the wireless local area network chip 320 is connected to the processor 330. The processor 330 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or a combination thereof. The wireless local area network chip 320 may be an AR9582, an AR9580, a QCA9880, a QCA9882, or the like of Qualcomm Atheros.

When a data frame received from a network needs to be sent to a station, the processor 330 sends the data frame to the wireless local area network chip 320. After receiving the data frame sent by the processor 330, the wireless local area network chip 320 performs processing such as encoding, modulation, and amplification on the data frame, and then sends a processed data frame to the antenna 310. After receiving the processed data frame sent by the wireless local area network chip 320, the antenna 310 sends the processed data frame to the outside at proper power.

After successfully receiving the data frame, the station sends an acknowledgment (ACK) frame to the access point. Therefore, after the data frame is sent to the station, if the processor 330 does not receive, within a preset time by using the antenna 310 and the wireless local area network chip 320, the ACK frame sent by the station, the processor 330 determines that sending the data frame to the station fails; on the contrary, if the processor 330 receives, within a preset time, the ACK frame sent by the station, the processor 330 determines that sending the data frame to the station succeeds.

After determining whether the access point succeeds in sending the data frame to the station, the processor 330 further needs to determine whether the access point fails to send a data frame to the station after last channel switching. For example, if the access point has not attempted to send any data frame to the station after the last channel switching and before the access point sends, to the station, the data frame mentioned in the last paragraph, and the access point fails to send, to the station, the data frame mentioned in the last paragraph, the access point always fails to send the data frame to the station after the last channel switching. For another example, if the access point has attempted to send one or more data frames to the station, and the one or more data frames fail to be sent after the last channel switching and before the access point sends, to the station, the data frame mentioned in the last paragraph, and the access point fails to send, to the station, the data frame mentioned in the last paragraph, the access point always fails to send the data frame to the station after the last channel switching. A method used by the processor 330 to determine whether the access point always fails to send the data frame to the station after the last channel switching includes the following.

(1) A channel switching tag is preset in the processor 330; or if the access point further includes a memory, a channel switching tag is set in the memory by the processor 330. The memory may include a volatile memory such as a random-access memory (RAM); the memory may also include a non-volatile memory such as a flash memory, a hard disk drive (HDD), or a solid-state drive (SSD); and the memory may further include a combination of the foregoing types of memories. If the processor 330 determines that sending a data frame to the station fails, the processor 330 queries a status of the channel switching tag. The channel switching tag is set when channel switching occurs on the access point, and is reset when the access point succeeds in sending a data frame to the station by using the antenna 310 and the wireless local area network chip 320. The channel switching tag is in a set state after being set, and the channel switching tag is in a reset state after being reset. Therefore, if the processor 330 learns, by means of a query, that the status of the channel switching tag is the reset state, the processor 330 may determine that the access point has once succeeded in sending a data frame to the station after the last channel switching. In this case, a reason that the access point fails to send the data frame this time is not that a null data frame that includes a power saving tag and that is sent by the station is not received during the last channel switching. If the processor 330 learns, by means of a query, that the status of the channel switching tag is the set state, the processor 330 may determine that the access point always fails to send the data frame to the station after the last channel switching. In this case, a reason that the access point fails to send the data frame this time may be that a null data frame that includes a power saving tag and that is sent by the station is not received during the last channel switching, and the access point does not know that the station has entered a power saving mode and wrongly sends the data frame to the station.

It may be understood that the set state and the reset state of the channel switching tag only need to be indicated by two different tags. For example, a value for the set state of the channel switching tag is 1, and a value for the reset state is 0; or a value for the set state of the channel switching tag is 0, and a value for the reset state is 1.

(2) A first variable and a second variable are preset in the processor 330; or if the access point further includes a memory, a first variable and a second variable are set in the memory by the processor 330. If the processor determines that sending a data frame to the station fails, the processor 330 queries a value of the first variable and a value of the second variable. The first variable is changed when channel switching occurs on the access point, and the second variable is changed to the value of the first variable when the access point succeeds in sending a data frame to the station. Therefore, if the value of the first variable is equal to the value of the second variable, the processor 330 may determine that the access point has once succeeded in sending a data frame to the station after the last channel switching. In this case, a reason that the access point fails to send the data frame this time is not that a null data frame that includes a power saving tag and that is sent by the station is not received during the last channel switching. If the processor 330 learns, by means of a query, that the value of the first variable is not equal to the value of the second variable, the processor 330 may determine that the access point always fails to send the data frame to the station after the last channel switching. In this case, a reason that the access point fails to send the data frame this time may be that a null data frame that includes a power saving tag and that is sent by the station is not received during the last channel switching, and the access point does not know that the station has entered a power saving mode and wrongly sends the data frame to the station.

It may be understood that when channel switching occurs on the access point, the processor 330 may change the value of the first variable by increasing the value of the first variable by 1, 2, or 3 or subtracting 1 or 2 from the value of the first variable or the like.

After the processor 330 determines that the access point always fails to send the data frame to the station after the last channel switching, the processor 330 suspends sending of a to-be-sent data frame to the station and buffers the to-be-sent data frame, to reduce a loss of a data frame to be sent to the station. Alternatively, the processor 330 may not suspend sending of the to-be-sent data frame or buffer the data frame, but continue to attempt to send the to-be-sent data frame to the station. If the to-be-sent data frame is lost, the data frame is retransmitted, or an upper layer protocol packet in the to-be-sent data frame may be resent by using an upper layer protocol.

Additionally, after determining that the access point always fails to send the data frame to the station after the last channel switching, the processor 330 sends a wakeup signal to the station by using the wireless local area network chip 320 and the antenna 310. For example, the processor 330 changes a status of a TIM bit of a beacon frame, and sends, to the wireless local area network chip 320, the beacon frame whose TIM bit is changed, where the beacon frame whose TIM bit is changed is used as the wakeup signal. After receiving the beacon frame whose TIM bit is changed and that is sent by the processor 330, the wireless local area network chip 320 performs processing such as encoding, modulation, and amplification on the beacon frame whose TIM bit is changed, and then sends a processed beacon frame to the antenna 310. After receiving the processed beacon frame whose TIM bit is changed and that is sent by the wireless local area network chip 320, the antenna 310 sends the processed beacon frame to the outside at proper power to wake up the station.

In this embodiment of the present invention, the access point determines whether the access point always fails to send the data frame to the station after the last channel switching. If the access point always fails to send the data frame to the station after the last channel switching, a reason that the access point fails to send the data frame to the station may be that a null data frame including a power saving tag is not received by the access point due to channel switching.

In this case, the access point may send the wakeup signal to the station to wake up the station, thereby reducing a data frame loss caused by channel switching.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM), a RAM, or the like.

What is disclosed above is merely an example of the embodiments of the present invention, and certainly is not intended to limit the protection scope of the present invention. A person of ordinary skill in the art may understand that all or some of processes for implementing the foregoing embodiments and equivalent modifications made in accordance with the claims of the present invention shall fall within the scope of the present invention.

The foregoing descriptions are merely examples of specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wakeup method, comprising:
    attempting to send, by an access point, a data frame to a station after channel switching;
    determining that the access point fails to successfully send the data frame to the station, and that the access point always fails to send a data frame to the station after channel switching; and
    in response to the determination that the access point fails to successfully send the data frame to the station, and that the access point always fails to send a data frame to the station after channel switching, continuing to send, by the access point, a wakeup signal to the station to wake up the station until any data frame is successfully sent by the access point to the station.

2. The method according to claim 1, wherein the method further comprises:
    when the access point fails to send the data frame to the station, and the access point always fails to send the data frame to the station after channel switching, suspending, by the access point, sending of a to-be-sent data frame to the station, and buffering the to-be-sent data frame.

3. The method according to claim 1, wherein the method further comprises:
    when a channel switching tag is in a set state, determining, by the access point, that the access point fails to send a data frame to the station after last channel switching, wherein the channel switching tag is set when channel switching occurs on the access point, and the channel switching tag is reset when the access point succeeds in sending a data frame to the station.

4. The method according to claim 1, wherein the method further comprises:
    when a first variable is different from a second variable, determining, by the access point, that the access point fails to send a data frame to the station after last channel switching, wherein the first variable is changed when channel switching occurs on the access point, and the second variable is changed to a value of the first variable when the access point succeeds in sending a data frame to the station.

5. An access point, comprising a wireless local area network chip and a processor, wherein
    the wireless local area network chip is connected to the processor; and
    the processor is configured to: attempt to send a data frame to a station by using the wireless local area network chip; and
    determine that the data frame fails to be successfully sent, and the processor always fails to successfully send one or more data frames to the station after channel switching;
    in response to the determination that the data frame fails to be successfully sent, and the processor always fails to successfully send one or more data frames to the station after channel switching, send a wakeup signal to the station by using the wireless local area network chip, to wake up the station.

6. The access point according to claim 5, wherein the processor is further configured to: when the access point fails to send the data frame to the station, and the access point always fails to send the data frame to the station after channel switching, suspend sending of a to-be-sent data frame to the station, and buffer the to-be-sent data frame.

7. The access point according to claim 5, wherein the processor is configured to determine, when a channel switching tag is in a set state, that the access point fails to send a data frame to the station after last channel switching, wherein the channel switching tag is set when channel switching occurs on the access point, and the channel switching tag is reset when the access point succeeds in sending a data frame to the station.

8. The access point according to claim 5, wherein the processor is configured to determine, when a first variable is different from a second variable, that the access point fails to send a data frame to the station after last channel switching, wherein the first variable is changed when channel switching occurs on the access point, and the second variable is changed to a value of the first variable when the access point succeeds in sending a data frame to the station.

* * * * *